July 8, 1969  J. W. HANSEN  3,453,970
STEERABLE TOY VEHICLE
Filed May 3, 1967
Sheet 1 of 3
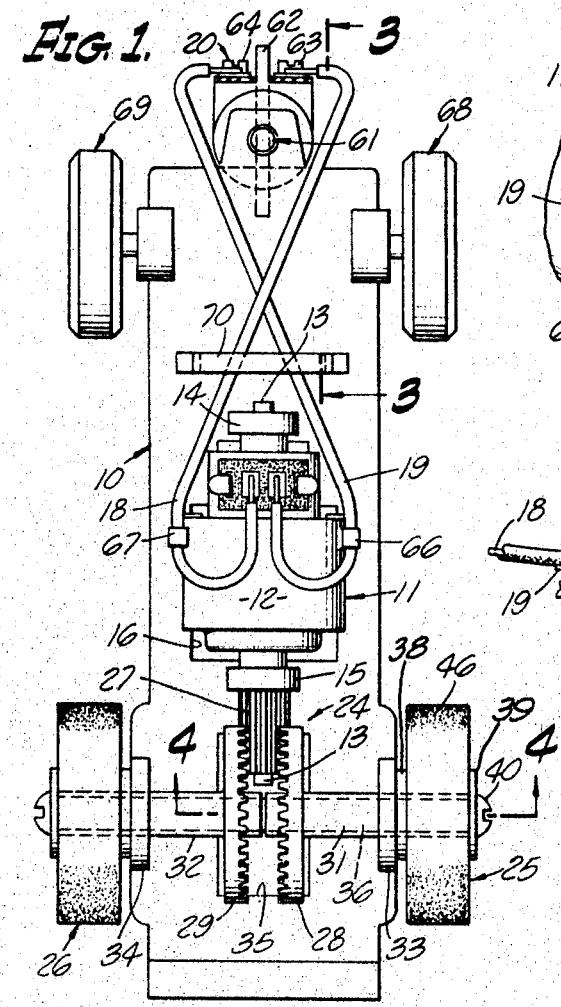
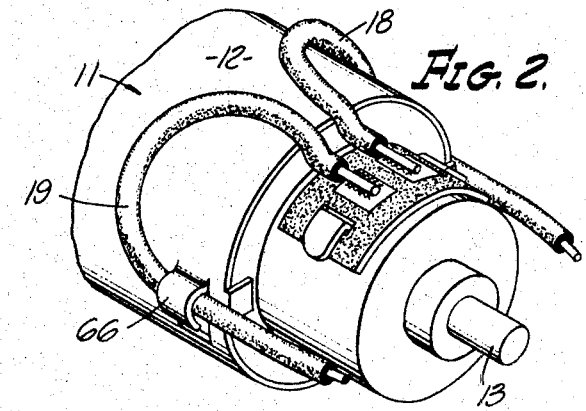
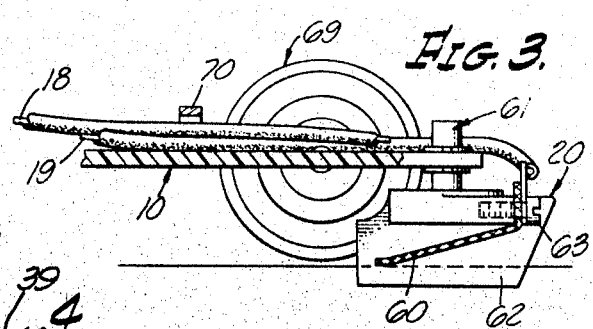
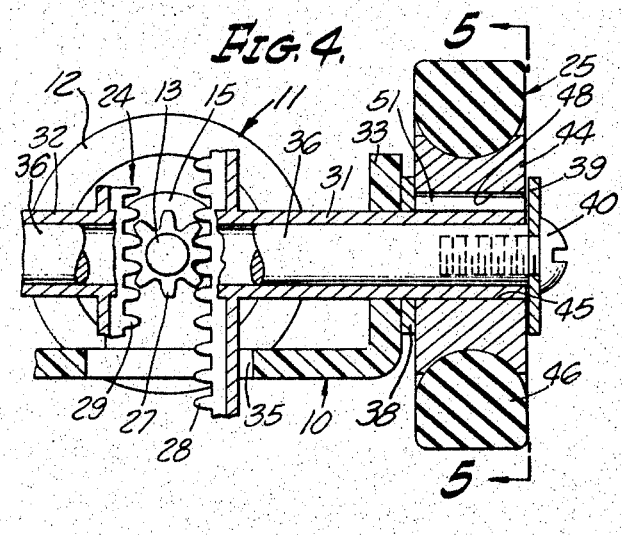
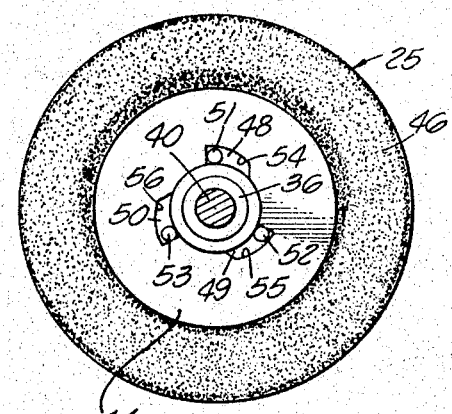
INVENTOR.
JOHN W. HANSEN
BY
Lyon & Lyon
ATTORNEYS

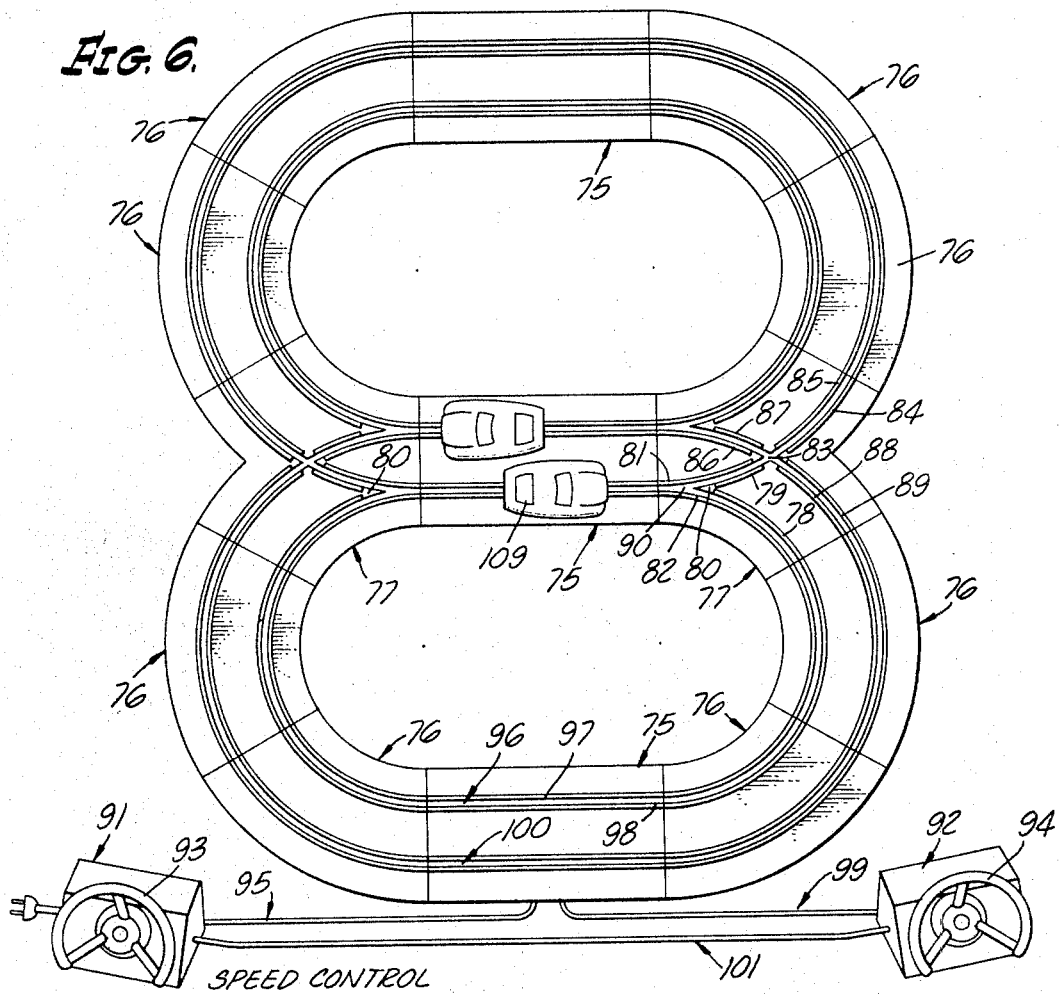

July 8, 1969          J. W. HANSEN          3,453,970
STEERABLE TOY VEHICLE
Filed May 3, 1967                                Sheet 3 of 3
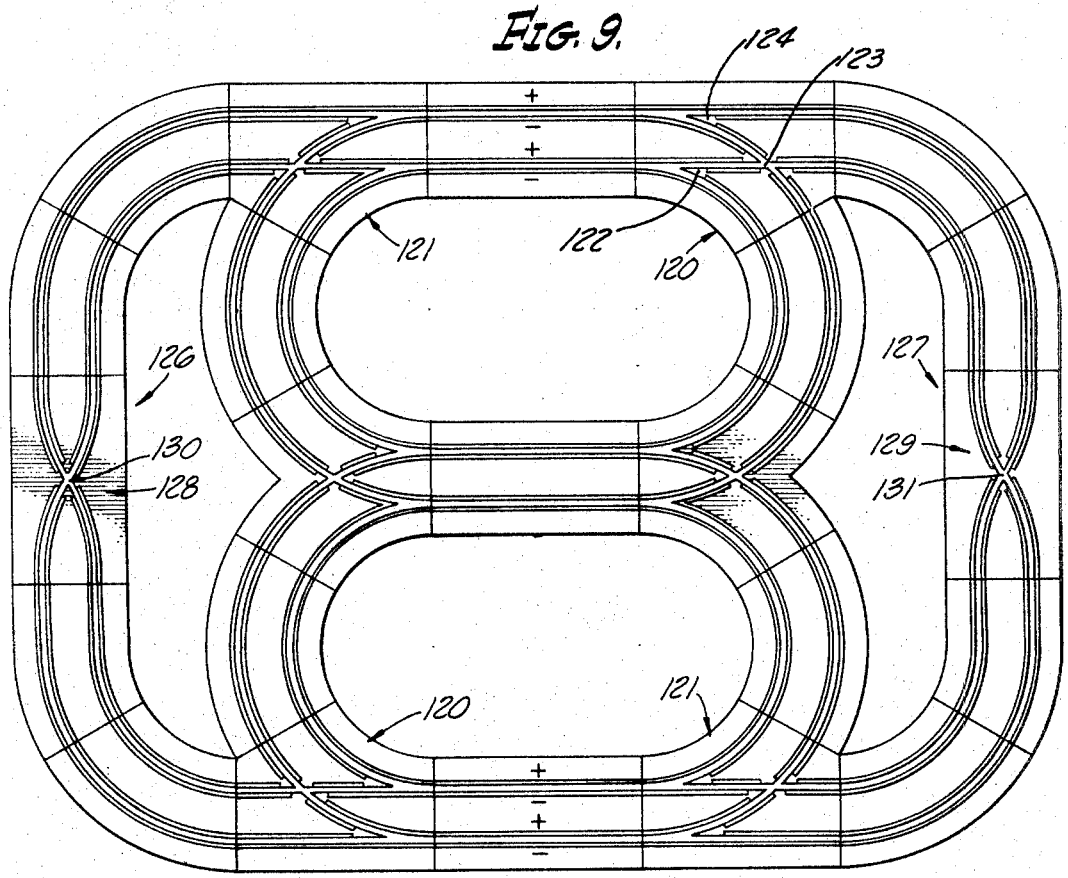
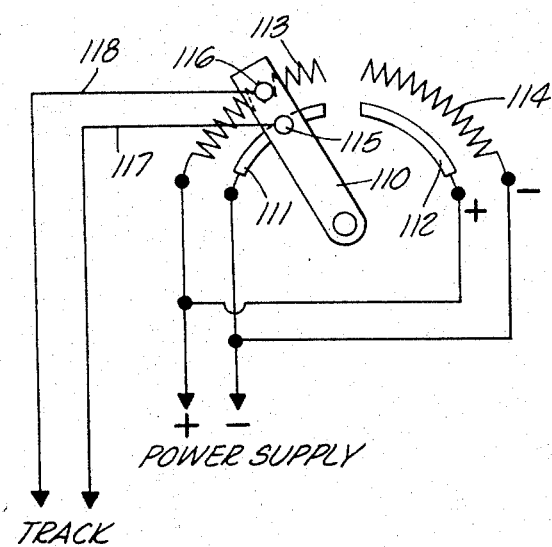
INVENTOR.
JOHN W. HANSEN
BY Lyon & Lyon
ATTORNEYS United States Patent Office 3,453,970
Patented July 8, 1969

3,453,970
STEERABLE TOY VEHICLE
John W. Hansen, Torrance, Calif., assignor to
Charles A. Elwell, Gardena, Calif.
Filed May 3, 1967, Ser. No. 635,814
Int. Cl. B61b *13/12;* B60m *1/34;* A63h *33/26*
U.S. Cl. 104—149                      14 Claims

ABSTRACT OF THE DISCLOSURE

A steerable electric motor driven toy vehicle employing motor torque to effect the steering particularly through movement of the pickup of a slot car type vehicle. A freely mounted D.C. motor drives a pair of wheels through a gear train and ratchet mechanism such that one or the other of the wheels of the vehicle acts to propel the vehicle in one general (e.g., forward) direction irrespective of the direction of shaft rotation of the motor. The housing of the motor is coupled with a steering mechanism, such as a pivoted pickup in the case of a slot car. Upon reversal of the voltage polarity applied to the motor, the housing thereof rotates slightly thereby turning the steering mechanism while still delivering driving power to one or the other of said wheels. Also disclosed is a controller mechanism as well as exemplary track for steerable slot cars.

---

This invention relates to toy motor driven vehicles, such as slot cars, and more particularly to an improved steerable vehicle utilizing the torque of the motor for simply and effectively providing a steering action.

Various types of toy electric motor driven vehicles are in use today. Perhaps the most widely known is the slot car which is used in conjunction with a slotted track having electrically conductive pickup rails for supplying power to the motor of the car and a guide slot therebetween. Other types of motor driven toy cars include those in which power is supplied thereto through wires coupled directly to the car. Slot cars are guided over a fixed path by the slot in the track upon which they are operated. Several steering arrangements have been provided for the nonslot cars, but typical steering mechanisms use Bowden wires, torsion wires and the like, for accomplishing remote mechanical steering of the car. Another arrangement is described in U.S. Patent No. 2,923,092 wherein the counter-torque of the driving motor is employed to operate a step wheel which in turn changes the position of the front wheels of the vehicle. By momentarily reversing the voltage to the motor, the step wheel is moved one step thereby causing the front wheels to change position. This arrangement has certain drawbacks, particularly the complexity thereof, but more importantly the positions of the front wheels must be carefully operated through a given sequence rather than being selectively and quickly turnable either to the right or to the left. Another arrangement is shown in U.S. Patent No. 2,488,464 wherein a toy car has a pivoted front axle and a driving motor mounted thereon. The motor drives one wheel, and by starting and stopping the motor the car may be steered. However, the direction of travel of the car occurs only in an irregular pattern.

Accordingly, it is a principal object of the present invention to provide a relatively simple and inexpensive arrangement for enabling a toy motor driven vehicle to be steered effectively.

It is a further object of this invention to provide a steerable slot car.

It is an additional object of this invention to provide a toy motor driven vehicle of relatively simple construction which may be effectively and reliably steered as desired.

A further object of this invention is to provide a toy slot car which is motor driven and wherein the counter torque of the motor is employed to position the pickup of the car to effectively and reliably enable steering thereof.

Another object of this invention is to provide a slot car system including track and a controller for use with a steerable slot car.

These and other objects and features of this invention will become more apparent upon reference to the following description taken in conjunction with the drawings in which:

FIGURE 1 is a plan view of a slot car, with the body removed, embodying the concepts of the present invention;

FIGURE 2 is a perspective view of a portion of a D.C. motor and coupling arrangement for utilizing the counter torque thereof in steering;

FIGURE 3 is a cross-sectional view taken along a line 3—3 of FIGURE 1 and illustrates the pickup assembly of the car;

FIGURE 4 is a cross-sectional view taken along a line 4—4 of FIGURE 1 illustrating a gear train and driving wheel arrangement of the car;

FIGURE 5 is a view taken along a line 5—5 of FIGURE 4 illustrating a ratchet arrangement for the driving wheels of the car;

FIGURE 6 is a plan view of an exemplary slotted track layout with which a steerable slot car according to the present invention may be used;

FIGURE 7 is a circuit diagram of steering controllers for use with slotted track and slot cars;

FIGURE 8 is a circuit diagram of an alternative controller; and

FIGURE 9 is a plan view of another slotted track layout.

Turning now to the drawings, FIGURES 1 through 5 illustrate a slot car embodying the concepts of the present invention. The body of the car is not shown for clarity of illustration. It will be apparent to those skilled in the art that any of various realistic and decorative bodies may be provided. The car has a chassis 10 which may be formed of sheet metal, plastic, or the like, and a suitable body may be secured thereto. A D.C. motor 11 has a housing 12, and the armature (not shown) thereof is coupled to a shaft 13 which extends from both ends of the housing as shown in FIGURE 1. The ends of the shaft 13 are supported in upright bushings 14 and 15 which are affixed to the chassis 10. The shaft 13 is freely mounted in the bushings 14 and 15 so that both the housing 12 and shaft 13 thereof are movable about the axis of the shaft. The chassis 10 includes a slot 16 therein to provide clearance for the housing 12. As will appear subsequently, the counter torque of the motor 11 imparted to the housing 12 upon a reversal of voltage polarity applied to the motor is mechanically communicated through electrical wires 18 and 19 to move a pivotally mounted pickup assembly 20 and thereby steer the car.

One end of the shaft 13 of the motor 11 is coupled through a gear train 24 to drive wheels 25 and 26. A pinion 27 is affixed to the shaft 13 and simultaneously meshes with a pair of crown gears 28 and 29. The crown gears 28 and 29 are integrally formed with, or affixed to, respective hollow axles 31 and 32 which extend through respective bushings 33 and 34 affixed to the chassis 10. A slot 35 is provided in the chassis 10 to accommodate the gears 28 and 29. The drive wheels 25 and 26 are mounted on the ends of the respective axles 31 and 32. A solid floating carrier axle 36 extends through both of the axles 31 and 32 to maintain these latter axles in alignment and to provide better stability of the gear train. Also, the drive wheels 25 and 26 are mounted on the respective axles 31 and 32 and retained on the axle 36 by means of suitable fasteners.

Inasmuch as both axles 31 and 32, and wheels 25 and 26 are alike, only the axle 31 and wheel 25 will be described in detail. A collar 38 is affixed to the axle 31 and the wheel 25 is mounted on the end of the axle 31. A washer 39 and a screw 40 are secured to the axle 36 to retain the wheel 25 on the axle 31. The wheel 26 is mounted and retained in the same manner. Both of the wheels 25 and 26 include a ratchet arrangement as illustrated in FIGURES 4 and 5 which enable one of the wheels to be driven when the motor shaft 13 is rotated in one direction and the other of the wheels to be driven when the shaft rotates in the opposite direction. When one wheel is driven, the other wheel "free-wheels," and rolls in a forward direction under the impetus of the forward motion of the car. In this manner, the car is only propelled in one general direction (e.g., forward) irrespective of the direction of rotation of the shaft 13 of the motor 11.

The wheel 25 includes a hub 44 having a bore 45 therethrough large enough to allow the wheel to freely rotate on the hollow axle 31. A conventional tire 46 is mounted on the hub 44. The hub 44 also includes three identical slots 48 through 50 which are smooth surfaced and spaced one-hundred and twenty degrees apart. These slots communicate with the bore 45 and are parallel with the axle 31. Rollers 51 through 53 are positioned within the respective slots 48 through 50 between the respective outer surfaces 54 through 56 and the periphery of the axle 31. The outer surfaces 54 through 56 slope inwardly to a distance from the periphery of the axle 31 sufficient to prevent the rollers from completely moving from one side to the other of the slot thereby enabling the rollers to slightly wedge with the surfaces and the axle 31 when the wheel 25 is driven. The sloped surfaces 54 through 56 of the slots are machined at an angle so the rollers will not jam the wheel but yet will allow effective coupling between the wheel and the axle 31 when the axle 31 is rotated in a direction to drive the car in a forward direction. Thus, when the axle 31 is rotated in one direction (to drive the car forward) the rollers 51 through 53 form wedges and cause the wheel 25 to be driven; and when the axle 31 is rotated in the opposite direction (which would tend to drive the car backward) the rollers 51 through 53 ride freely in the larger positions of the slots 48 through 50 and allow the wheel 25 to "free-wheel." The collar 38 and the washer 39 retain the rollers within the slots and retain the wheel 25 on the axle 31. As noted previously, the construction of the axle 32 and wheel 26 is the same as that described above.

Irrespective of the polarity of the voltage applied to the motor 11, one of the axles 31 or 32 is always driven in a direction which tends to drive the car forward and the other axle is driven in a direction which tends to drive the car backward. With the ratchet arrangement one or the other of the wheels always rotates to drive the car forward while the other wheel free-wheels.

Turning now to the steering arrangement which was briefly discussed above, the wires 18 and 19 supply current to the motor 11 from conventional braided pickup brushes, only a brush 60 (note FIGURE 3) being seen in the drawings. These brushes ride along the metal rails of the track and are suitably energized from a power source as will be explained subsequently. The pickup assembly 20 is pivotally mounted at 61 to the chassis 10 and includes a depending finger 62 which rides in a slot in the slotted track between the rails in a conventional manner. The wires 18 and 19 and braided pickup brushes are affixed to the assembly 20 by means of screws 63 and 64 or the like. The insulated wires 18 and 19 are solidly secured mechanically to the housing 12 of the motor 11 by means of clips 66 and 67 formed in the housing 12. Conventional wheels 68 and 69 are suitably rotatably mounted on the chassis 10.

The wires 18 and 19 are insulated and preferably are stranded, such as No. 22 to No. 24 stranded wire, rather than solid wire. A small amount of flexibility allows the pickup assembly 20 to properly follow the slotted track and to prevent the finger 62 from catching on a junction or interface between track sections. Solid rods between the motor housing and pickup assembly may be used along with a small spring between each rod and the pickup assembly to allow a slight amount of flexibility, but stranded wire is preferable.

When voltage is applied to the motor 11, the shaft 13 is torqued in one direction and the housing 12 is torqued and tends to rotate in the opposite direction. As the housing 12 tends to rotate, one wire 18 or 19 is effectively extended and the other is effectively retracted thereby causing rotation of the pickup assembly 20 in one direction. For example, if the housing 12 rotates slightly counter clockwise (toward the left as seen in FIGURE 1), the wire 18 is pushed and the wire 19 is pulled thereby causing the pickup assembly to rotate counter clockwise thereby steering the car to the left. In this case, the wheel 25 is the driven wheel and the wheel 26 free wheels. Not only does this arrangement enable the pickup assembly and thus the depending finger 62 to steer the car to the left, but also the outside wheel 25 is driven during the turn to give better traction thereby complementing the action of the pickup assembly. These two operations enable faithful steering to be achieved. Even more effective steering action is provided by affixing a wire guard 70 to the chassis 10 through which the wires 18 and 19 extend. Preferably the wire guard 70 should be relatively close to the motor 11, and it acts to loosely contain the wires 18 and 19 and somewhat reduces bending thereof.

Additionally, a braking action can be accomplished while the car is traversing a curve by applying the proper polarity voltage to the motor 11 such that the pickup assembly 20 tends to steer in the opposite direction to the curve thereby causing the depending finger 62 thereof to drag in the slot of the slotted track. This allows the car to be braked momentarily when entering a curve thereby allowing a much faster speed in the preceding straightaway approach to the curve.

Turning now to FIGURES 6 and 7, an exemplary slotted track layout is illustrated in FIGURE 6 along with car controllers, and circuit diagrams for the car controllers are illustrated in FIGURES 7 and 8. The "figure 8" layout shown in FIGURE 6 includes conventional slotted track straight sections 75 and curved sections 76. Special sections 77 are provided wherein the rails are not continuous in order to prevent electrical shorting of the two tracks. Thus it will be seen that the rails 78 and 79 are not connected together and terminate at 80; however, the rail 78 is connected with a jumper (not shown) underneath the track section to a rail 81 and the rail 79 is similarly connected with a rail 82. In a like manner, the four rails terminate at point 83 but are interconnected underneath the section. That is, the rails 79 and 81 are connected by a jumper (not shown) to respective rails 84 and 85, and rails 86 and 87 are connected by jumpers (not shown) to respective rails 88 and 89. A continuous slot 90 is provided between the adjacent rails in a conventional manner.

Controllers 91 and 92 having respective steering wheels 93 and 94 coupled with internal double pole double throw switches are electrically coupled to the track layout in a conventional manner. The controller 91 is connected through a two wire cable 95 to the track 96 having rails 97 and 98 to control one slot car, and the controller 92 is coupled in a similar manner through a two wire cable 99 to a track 100 to control the second slot car. Electrical power is supplied between the controllers 91 and 92 through a cable 101. FIGURE 7 illustrates a circuit diagram of the controllers. The controller 91 may be termed a "master console" because it includes a conventional D.C. power supply 102. Power from the supply 102 is coupled through a conventional speed controller (not shown), which is coupled with terminals 103 and 104, to a double throw switch 105 which in turn is connected to the two conductor cable 95. In a similar manner, power is coupled through the cable 101 and another conventional speed controller (not shown), which is coupled with terminals 106 and 107, to a double pole double throw switch 108 in the console 92 which in turn is coupled to the cable 99. The steering wheels 93 and 94 are mechanically coupled to operate the respective double pole double throw switches 105 and 108 to enable the voltage polarity applied to the tracks 96 and 100 to be selectively reversed by rotating the steering wheels. The speed controllers are operated in a conventional manner to control the magnitude of the voltage applied to the tracks. If the steering wheel 93 is rotated clockwise, it will cause voltage of one polarity to be applied to the track 96, and if rotated counter clockwise the opposite polarity voltage will be applied. As a car 109 approaches the right hand section 77, the steering wheel 93 may be turned in either direction to selectively cause the car to turn to the right or to the left and move into either the lower or upper leg of the track layout, respectively.

It is sometimes desirable that the layout include a straight section of track 75 preceding a section 77; otherwise the centrifugal force of the car occasioned by a curved section preceding the section 77 sometimes may hamper the steerability at the turnoff. It will be apparent to those skilled in the art that not only do the concepts of the present invention allow conventional racing of slot cars, but also provide even greater challenges by enabling steering of the car such that "follow the leader" or the like can be accomplished.

FIGURE 8 illustrates a circuit for another controller, but in this controller both reversing and speed control can be accomplished through manipulation of a steering wheel coupled to a movable arm 110. The power supply is coupled to fixed contacts 111 and 112 and to resistances 113 and 114. The arm 110 has contacts 115 and 116 which are insulated from each other and connected through wires 117 and 118 to a track. The contact 115 engages either the fixed contact 111 or 112 to cause reversal of the voltage applied to the track, and the contact 116 engages either the resistance 113 or 114 to control the magnitude of the voltage.

FIGURE 9 illustrates another example of a track layout having an enclosed "figure 8." Controllers as shown in FIGURE 6 or FIGURE 8 may be used but are not shown. The "figure 8" portion is identical with that shown in FIGURE 6 with the exception of sections 120 and 121. The rails of these sections 120 and 121 are isolated and interconnected underneath the sections by jumpers (not shown) in the same manner as the sections 77 shown in FIGURE 6. The outer legs of the track 126 and 127 of the layout shown in FIGURE 9 include crossover sections 128 and 129. The tracks of these sections also are isolated at the junctions 130 and 131, but are not wired together underneath the sections as are the sections 77, 120 and 121. This electrical isolation in the outer legs 126 and 127 is required where there is an even number of loops enclosed in the layout as shown in FIGURE 9; otherwise the two tracks would become electrically shorted together.

Alternatively, the sections 128 and 129 may be straight sections, and with the tracks broken (i.e., isolated like the crossover sections discussed above), but in this cae a car would move from one track to another in going through the "figure 8" portion of the layout. That is, if a car were on the inner track at the bottom of the layout and proceeded through the "figure 8," it would end up on the outer track at the top of the layout. If the car then continued around one of the legs 126 or 127, it would end up on the outer track at the bottom of the layout. If the car again traverses the loops and an outer leg, it then ends up on the inner tracks. Thus, in this case the layout essentially comprises only one track and only one car and one controller are used. The crossover sections 128 and 129 must be used at strategic points in any enclosed even number of loops where two cars are used. Thus, with the arrangement shown in FIGURE 9 a car on the inner track at the bottom of the layout will end up on the outer track at the top of the layout but after it traverses one of the crossover sections 128 or 129 it will again be on the inner track at the bottom of the layout. When a car traverses a crossover the polarity and steering becomes reversed and a double pole double throw switch may be added to the controllers to correct for this condition. This switch, which may be mounted on the controller, is operated when a car passes the crossover. If a triple loop (or any odd number of loops) enclosed layout like that shown in FIGURE 9 but with an additional loop to the "figure 8" is employed, the crossover sections 128 and 129 should not be utilized nor do the outer legs need to be isolated electrically at 130 and 131 as discussed previously.

The concepts of the present invention also may be applied to a non-slot car to enable selective steering thereof. In this case, the torque of the housing 12 of the motor 11 may be used to rotate a front axle rather than the pickup assembly 20. The housing 12 may be coupled with a pivotally mounted forward axle through wires, like the wires 18 and 19, or through connecting rods. Alternatively, the front wheels of the car may be driven through the gear train and ratchet assembly shown in FIGURE 1 to alternately drive one or the other of the wheels to provide a steering action.

The present embodiments of this invention are to be considered in all respects as illustrative and not restrictive and all changes which come within the meaning and range of equivalency of the claims therefore are intended to be embraced therein.

What is claimed is:

1. A motor driven toy vehicle which is steerable by the selective application of voltage signals to the motor thereof comprising chassis means for said vehicle, electrical motor means having a rotatable output shaft and housing, said rotatable output shaft being mounted on said chassis means, gear train means mounted on said chassis means for driving wheels of said vehicle, said motor shaft being coupled with said gear train means, steering means pivotally mounted on said chassis for affecting the direction of movement of said vehicle, and coupling means directly coupling said housing of said motor means with said steering means to directly impart movement of said housing to said steering means.

2. A vehicle as in claim 1 wherein said steering means comprises pickup means having a depending finger for engaging a slot of a slotted track.

3. A vehicle as in claim 2 wherein said coupling means comprises stranded electrical conductors and said pickup means includes pickup brushes coupled with said conductors, and said conductors are coupled to supply electrical power to said motor.

4. A vehicle as in claim 1 wherein said gear train means includes a pair of crown gears driven from said motor shaft, said crown gears having axles affixed thereto, and wheels mounted on said axles, said wheels including ratchet means for enabling one or another of said wheels to be driven by its respective axle to propel said vehicle in one general direction irrespective of the direction of rotation of said motor shaft.

5. A vehicle as in claim 2 wherein
said gear train means includes a pair of crown gears driven from said motor shaft, said crown gears having axles affixed thereto, and
wheels mounted on said axles, said wheels including ratchet means for enabling one or another of said wheels to be driven by its respective axle to propel said vehicle in one general direction irrespective of the direction of rotation of said motor shaft.

6. A steerable slot car comprising
chassis means upon which a car body may be mounted,
electrical motor means having a rotatable shaft, said rotatable shaft being pivotally mounted on said chassis,
pickup means pivotally mounted on said chassis means, said pickup means having a finger for engaging a slot of a slotted track, and
coupling means coupling said motor means to said pickup means to impart movement to said pickup means in response to movement of said motor means.

7. A car as in claim 6 wherein
said coupling means comprises a pair of stranded electrical conductors electrically connected between said pickup means and said motor means, and
said motor means has a housing, said electrical conductors being affixed to said housing in a spaced apart relationship and being affixed to said pickup means in a spaced apart relationship.

8. A car as in claim 7 including
guard means affixed to said chassis means intermediate said motor means and said pickup means, said electrical conductors extending through said guard means.

9. A car as in claim 6 including
a pair of drive wheels mounted on said chassis means,
gear train means coupled with the shaft of said motor means, and
ratchet means coupling said gear train means to said drive wheels to cause motion to be imparted to one or the other of said drive wheels to propel said car in one general direction irrespective of the direction of rotation of said shaft of said motor means.

10. A motor driven toy vehicle which is selectively steerable in response to the polarity of voltage applied to the motor thereof comprising
chassis means for said vehicle,
electrical motor means having a rotatable output shaft and a housing, said rotatable output shaft being mounted on said chassis means,
gear train means mounted on said chassis means and being coupled with said output shaft, said gear train means including a pair of axles, and
driving wheels for said vehicle, said driving wheels including ratchet means respectively coupling said wheels with said axles to cause one or the other of said wheels to impart motion to said vehicle in one general direction irrespective of the direction of rotation of said output shaft.

11. A vehicle as in claim 10 including
pickup means pivotally mounted on said chassis, and
coupling means affixed to said housing of said motor means and affixed to said pickup means for directly imparting movement of said housing to said pickup means.

12. A motor driven toy vehicle which is selectively steerable depending upon the polarity of voltage applied to the motor thereof comprising
chassis means for said vehicle,
electrical motor means having a rotatable output shaft and a housing, said rotatable output shaft being mounted on said chassis means,
steering means pivotally mounted on said chassis for affecting the direction of movement of said vehicle, and
first and second elongated coupling means secured in a spaced apart relationship to said housing and secured in a spaced apart relationship to said steering means for imparting movement of said housing to said steering means.

13. A vehicle as in claim 12 wherein
said steering means comprises pickup means having a depending finger for engaging a slot of a slotted track, and having brushes for engaging rails of a slotted track, and
said first and second coupling means comprises a pair of stranded electrical conductors electrically connecting said brushes and said motor means.

14. A vehicle as in claim 13 including
gear train means mounted on said chassis means and coupled to wheels to drive one or another of said wheels to propel said vehicle in one general direction irrespective of the direction of rotation of said motor shaft.

References Cited

UNITED STATES PATENTS 3,048,124   8/1962   Lovell.

ARTHUR L. LA POINT, *Primary Examiner.*

D. F. WORTH III, *Assistant Examiner.*

U.S. Cl. X.R.

46—243; 104—60; 273—86